US008480853B2

(12) United States Patent
Ban

(10) Patent No.: US 8,480,853 B2
(45) Date of Patent: Jul. 9, 2013

(54) PAPERMAKING AND PRODUCTS MADE THEREBY WITH IONIC CROSSLINKED POLYMERIC MICROPARTICLE

(75) Inventor: Weiping Ban, Memphis, TN (US)

(73) Assignee: Buckman Laboratories International, Inc., Memphis, TN (US)

( * ) Notice: Subject to any disclaimer, the term of this patent is extended or adjusted under 35 U.S.C. 154(b) by 0 days.

(21) Appl. No.: 13/281,597

(22) Filed: Oct. 26, 2011

(65) Prior Publication Data
US 2012/0103549 A1 May 3, 2012

Related U.S. Application Data

(66) Substitute for application No. 61/408,262, filed on Oct. 29, 2010.

(51) Int. Cl.
D21H 17/38 (2006.01)
D21H 17/37 (2006.01)
D21H 17/28 (2006.01)
D21H 17/52 (2006.01)

(52) U.S. Cl.
USPC ............ 162/168.1; 162/158; 162/164.1; 162/164.3; 162/168.3; 162/175; 162/177; 162/178; 162/183

(58) Field of Classification Search
USPC .. 162/158, 164.1, 164.3, 164.6, 168.1–168.3, 162/175, 177, 178, 183
See application file for complete search history.

(56) References Cited

U.S. PATENT DOCUMENTS

| 3,647,763 | A | | 3/1972 | Stockmann et al. |
| 3,872,039 | A | | 3/1975 | Vaughn et al. |
| 4,191,799 | A | | 3/1980 | Gruber |
| 4,195,008 | A | | 3/1980 | Gruber |
| 4,270,977 | A | * | 6/1981 | Herman et al. ............ 162/168.7 |
| 4,295,987 | A | * | 10/1981 | Parks ........................... 252/194 |
| 4,305,781 | A | | 12/1981 | Langley et al. |
| 4,465,555 | A | | 8/1984 | Linhart et al. |
| 4,480,078 | A | | 10/1984 | Gujarathi |
| 4,753,710 | A | | 6/1988 | Langley et al. |
| 4,780,500 | A | | 10/1988 | Sinka et al. |
| 4,913,775 | A | | 4/1990 | Langley et al. |
| 4,969,976 | A | | 11/1990 | Reed |
| 5,008,133 | A | | 4/1991 | Herbet et al. |
| 5,021,529 | A | | 6/1991 | Garrett |
| 5,032,227 | A | | 7/1991 | Derrick et al. |
| 5,064,692 | A | | 11/1991 | Hofmann et al. |
| 5,152,925 | A | | 10/1992 | Furman |
| 5,167,766 | A | | 12/1992 | Honig et al. |
| 5,171,808 | A | | 12/1992 | Ryles et al. |
| 5,185,061 | A | | 2/1993 | Lowry et al. |
| 5,221,435 | A | | 6/1993 | Smith, Jr. |
| 5,266,162 | A | * | 11/1993 | Richard et al. ............... 162/135 |
| 5,274,055 | A | * | 12/1993 | Honig et al. .................. 524/47 |
| 5,318,669 | A | | 6/1994 | Dasgupta |
| 5,328,510 | A | | 7/1994 | Hofmann et al. |
| 5,336,318 | A | | 8/1994 | Attard et al. |
| 5,338,407 | A | | 8/1994 | Dasgupta |
| 5,418,057 | A | | 5/1995 | Tokiyoshi et al. |
| 5,443,899 | A | | 8/1995 | Barcus et al. |
| 5,458,905 | A | | 10/1995 | Heagle |
| 5,473,033 | A | | 12/1995 | Kuo et al. |
| 5,571,380 | A | | 11/1996 | Fallon |
| 5,630,907 | A | | 5/1997 | Nilz et al. |
| 5,681,912 | A | | 10/1997 | Kuo et al. |
| 5,700,893 | A | | 12/1997 | Kuo et al. |
| 5,718,827 | A | | 2/1998 | Rydell et al. |
| 5,721,302 | A | | 2/1998 | Wood et al. |
| 5,763,100 | A | | 6/1998 | Quick et al. |
| 5,865,951 | A | | 2/1999 | Kawakami et al. |
| 6,007,679 | A | | 12/1999 | Nagarajan et al. |
| 6,042,732 | A | | 3/2000 | Jankowski et al. |
| 6,063,240 | A | | 5/2000 | Eriksson et al. |
| 6,083,348 | A | | 7/2000 | Auhorn et al. |
| 6,083,404 | A | | 7/2000 | Sommese et al. |
| 6,168,686 | B1 | | 1/2001 | Sutman et al. |
| 6,183,650 | B1 | | 2/2001 | Drummond |
| 6,184,258 | B1 | | 2/2001 | Drummond |
| 6,273,998 | B1 | | 8/2001 | Kuo et al. |
| 6,310,157 | B1 | | 10/2001 | Heard et al. |
| 6,331,229 | B1 | | 12/2001 | Wong Shing et al. |
| 6,352,766 | B1 | | 3/2002 | Crandall et al. |
| 6,359,040 | B1 | | 3/2002 | Burdick |
| 6,432,271 | B1 | | 8/2002 | Wong Shing et al. |
| 6,451,169 | B1 | | 9/2002 | Ward et al. |

(Continued)

FOREIGN PATENT DOCUMENTS

| CA | 1111210 | 10/1981 |
| CA | 2122956 A1 | 5/1994 |

(Continued)

OTHER PUBLICATIONS

International Search Report and Written Opinion issued in corresponding International Patent Application No. PCT/US2011/057798 dated Apr. 12, 2012 (9 pages).
Polverari, et al., "New micropolymer technologies for increased drainage and retention for both wood and non-wood containing furnishes," 41st Pulp and Paper International Congress and Exhibition, San Paulo, Brazil, Oct. 13-16, 2008 (Abstract only) (1 page).
McNeal, et al., "The effect of polymer conformation on microparticle efficiency in drainage and retention (includes slides)," 2006 TAPPI Papermakers Conference, Atlanta, Georgia, Apr. 24-28, 2006, Session 24 (Abstract only) (1 page).
Yan, et al., "The applications of cationic polymeric microparticles in papermaking," Proceedings of the International Symposium on Emerging Technologies of Pulping and Papermaking, 2nd, Guangzhou, China, Oct. 9-11, 2002 (Abstract only) (1 page).
Honig, et al, "Design and development of the micro-polymer system: an "organic microparticle" retention/drainage system," Nordic Pulp and Paper Research Journal, vol. 15, No. 5, 2000 (Abstract only) (1 page).

(Continued)

Primary Examiner — Jose A Fortuna
(74) Attorney, Agent, or Firm — Kilyk & Bowersox, P.L.L.C.

(57) ABSTRACT

Enhancement of papermaking drainage and retention properties of aqueous cellulosic suspensions used for production of paper or paper board with a retention/drainage additive system including ionic crosslinked acrylic acid-acrylate copolymer microparticles is described. Paper and paperboard products made with these copolymer microparticles are also described.

23 Claims, 2 Drawing Sheets

U.S. PATENT DOCUMENTS

| | | | |
|---|---|---|---|
| 6,462,139 B1 | 10/2002 | Das et al. | |
| 6,524,439 B2 | 2/2003 | Chen et al. | |
| 6,616,949 B2 | 9/2003 | Jonsson et al. | |
| 6,712,934 B2 | 3/2004 | Ahlgren et al. | |
| 6,719,881 B1 | 4/2004 | Hunter et al. | |
| 6,734,244 B2 | 5/2004 | Confalone et al. | |
| 6,740,373 B1 | 5/2004 | Swoboda et al. | |
| 6,770,170 B2 | 8/2004 | Covarrubias | |
| 6,815,502 B1 * | 11/2004 | Lang et al. | 525/191 |
| 6,919,111 B2 | 7/2005 | Swoboda et al. | |
| 7,361,712 B2 | 4/2008 | Satake et al. | |
| 7,901,771 B2 | 3/2011 | Butters et al. | |
| 7,918,965 B2 * | 4/2011 | Leduc et al. | 162/168.1 |
| 8,048,268 B2 * | 11/2011 | Jiang et al. | 162/166 |
| 2002/0053413 A1 | 5/2002 | Zhang et al. | |
| 2002/0081336 A1 | 6/2002 | Jonsson et al. | |
| 2003/0106659 A1 | 6/2003 | Malmstrom et al. | |
| 2003/0192664 A1 | 10/2003 | Kulick et al. | |
| 2004/0019339 A1 | 1/2004 | Ranganathan et al. | |
| 2004/0052855 A1 | 3/2004 | Vuaridel et al. | |
| 2006/0089719 A1 | 4/2006 | Trieu | |
| 2006/0142430 A1 | 6/2006 | Harrington et al. | |
| 2007/0107866 A1 | 5/2007 | Liesen et al. | |
| 2007/0119560 A1 | 5/2007 | Birkert et al. | |
| 2007/0122484 A1 | 5/2007 | Jonsson et al. | |
| 2007/0173594 A1 * | 7/2007 | Farwaha et al. | 524/556 |
| 2007/0173610 A1 | 7/2007 | Wada et al. | |
| 2008/0196852 A1 * | 8/2008 | Leduc et al. | 162/164.6 |
| 2009/0025891 A1 | 1/2009 | Wong Shing et al. | |
| 2009/0053317 A1 | 2/2009 | Vigo et al. | |
| 2009/0186542 A1 | 7/2009 | Kondo et al. | |
| 2010/0183890 A1 | 7/2010 | Wicher | |
| 2011/0094695 A1 * | 4/2011 | Jiang et al. | 162/166 |
| 2011/0253333 A1 * | 10/2011 | Ban et al. | 162/164.6 |
| 2012/0103549 A1 * | 5/2012 | Ban | 162/164.6 |

FOREIGN PATENT DOCUMENTS

| | | | |
|---|---|---|---|
| CA | 2336970 A1 | | 1/2000 |
| DE | 2843612 A1 | | 4/1980 |
| DE | 4436317 A1 | | 4/1996 |
| EP | 462365 A1 | * | 12/1991 |
| EP | 0790351 A2 | | 8/1997 |
| EP | 1047834 B1 | | 5/2006 |
| JP | 51-067403 | | 6/1976 |
| JP | 56-112599 | | 9/1981 |
| JP | 56-154597 | | 11/1981 |
| JP | 58-180696 | | 10/1983 |
| JP | 62-043467 | | 2/1987 |
| JP | 62-279811 | | 12/1987 |
| JP | 64-061588 | | 3/1989 |
| JP | 01-192899 | | 8/1989 |
| JP | 02-014096 | | 1/1990 |
| JP | 03-047813 | | 2/1991 |
| JP | 04-185796 | | 7/1992 |
| JP | 05-093393 | | 4/1993 |
| JP | 07-062254 | | 3/1995 |
| JP | 09-078423 | | 3/1997 |
| JP | 2000-282390 | | 10/2000 |
| JP | 2003-155689 | | 5/2003 |
| JP | 2003-193395 | | 7/2003 |
| JP | 2006-104433 | | 4/2006 |
| JP | 2007-100254 | | 4/2007 |
| JP | 2008-031584 | | 2/2008 |
| JP | 2008-063691 | | 3/2008 |
| JP | 2009-191423 | | 8/2009 |
| WO | 9426972 A1 | | 11/1994 |
| WO | 0014331 A1 | | 3/2000 |
| WO | 0053532 A1 | | 9/2000 |
| WO | 0058735 A2 | | 10/2000 |
| WO | 0151707 A1 | | 7/2001 |
| WO | 2006071175 A2 | | 7/2006 |

* cited by examiner

US 8,480,853 B2

PAPERMAKING AND PRODUCTS MADE THEREBY WITH IONIC CROSSLINKED POLYMERIC MICROPARTICLE

This application claims the benefit under 35 U.S.C. §119 (e) of prior U.S. Provisional Patent Application No. 61/408,262, filed Oct. 29, 2010, which is incorporated in its entirety by reference herein.

BACKGROUND OF THE INVENTION

The present invention relates to papermaking, and more particularly, to papermaking and products made thereby with an ionic crosslinked polymeric microparticle-containing retention aid system.

In the production of paper and paperboard from a dilute aqueous suspension of cellulose fibers on papermaking apparatus, the suspension can be passed through one or more shear stages and the resultant suspension is drained through a wire to form a sheet, which is then dried. It is common to include various inorganic additives and/or organic polymeric materials in the suspensions in efforts to improve the process or products thereof. Process improvements have been sought in the past, for example, in retention, drainage, and drying, and in the formation (or structure) properties of the final paper sheet. However, these or other papermaking parameters can come into conflict with each other in unpredictable manners. Retention is a term used in papermaking to indicate the extent to which the pulp fibers and other additives which are added to the furnish are retained in the finished paper. A retention aid generally acts by increasing the flocculating tendency of the pulp fibers and additives to inhibit their loss during drainage through the paper machine wires or screens. Drainage or de-watering is another papermaking requirement, which tends to conflict with retention, such as when a rapid reduction is sought in water content of an aqueous pulp suspension in the sheet forming areas of a paper machine.

Microparticles and other particulate materials have been added to papermaking pulps as retention aids. Different from water-soluble polymer retention systems, microparticle retention systems typically refer to water-insoluble microparticulate retention aids. It is known to use silica, silica sols, and bentonite, as inorganic or mineral microparticles for retention aids in papermaking. Specific polymeric microparticles have been used as retention aids in papermaking. For example, U.S. Patent Application Publication No. 2006/0142430 A1 relates to a method which provides for addition of a composition that includes an associative polymer and an organic microparticle, which microparticles are copolymers of a non-ionic monomer, an ionic monomer, and a crosslinking agent, and optionally a siliceous material to a papermaking slurry. U.S. Pat. No. 5,171,808 relates to crosslinked anionic and amphoteric microparticles.

Other chemistries and forms of organic microparticles, different from previous microparticles, would be useful in improving wet-end drainage and retention in papermaking.

SUMMARY OF THE PRESENT INVENTION

A feature of the present invention is to provide an enhanced additive system for improving wet-end drainage and retention in papermaking using ionic crosslinked polymeric microparticles.

Another feature of the present invention is to provide increased papermaking retention efficiencies and de-watering rates with a retention/drainage additive system comprising ionic crosslinked polymeric microparticles.

An additional feature of the present invention is to provide paper products containing ionic crosslinked polymeric microparticles.

Additional features and advantages of the present invention will be set forth in part in the description that follows, and in part will be apparent from the description, or can be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates, in part, to a process for making paper, and the products thereof. The process includes adding ionic crosslinked polymeric microparticles to a paper making pulp to form a treated pulp, and forming the treated pulp into paper or paperboard, wherein the ionic crosslinked polymeric microparticles comprise a crosslinked acrylic acid-acrylate copolymer. The ionic crosslinked polymeric microparticles can be anionic water-insoluble microparticles. The ionic crosslinked polymeric microparticles can be added in an amount effective to improve performance with respect to increasing fiber retention and drainage performance while maintaining satisfactory formation and strength properties, such as compared to paper made with the suspension having silica microparticles.

The present invention further relates to a papermaking system for forming a paper making pulp into a paper or paperboard that includes a supply of papermaking pulp, a blend chest in communication with the supply of pulp, a screen for collecting pulp after discharge from the blend chest and optionally passing through one or more additional processing units before reaching the screen, and a composition feeding device for feeding a composition to the pulp for application thereto prior to paper forming, wherein the composition includes the indicated ionic crosslinked polymeric microparticles comprising a crosslinked acrylic acid-acrylate copolymer.

It is to be understood that both the foregoing general description and the following detailed description are exemplary and explanatory only and are only intended to provide a further explanation of the present invention, as claimed. The accompanying drawings, which are incorporated in and constitute a part of this application, illustrate several embodiments of the present invention and together with description, serve to explain the principles of the present invention.

DETAILED DESCRIPTION OF THE PRESENT INVENTION

Figure 1:
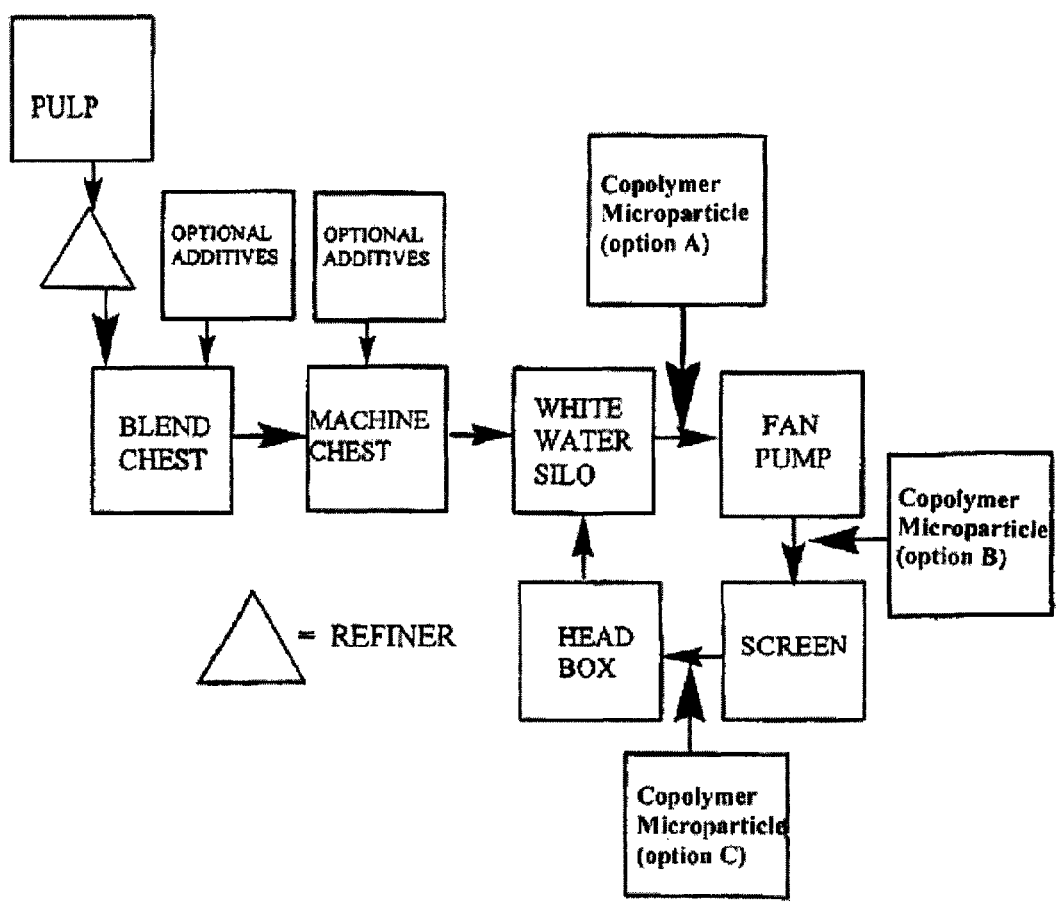
FIG. 1 is flow chart showing one example of a paper making method according to the present invention.

The present invention relates to papermaking and papermaking products. The present invention in part provides methods of making paper or paperboard and retention aids for such methods which include one or more types of ionic crosslinked polymeric microparticles which contain one or more types of an ionic crosslinked acrylic acid-acrylate copolymer. The ionic crosslinked polymeric microparticles can, for example, be anionic water-insoluble microparticles. The ionic crosslinked polymeric microparticles can be used as additives in papermaking to provide paper products made with improved papermaking drainage and retention performance while maintaining satisfactory formation and strength properties. The present invention also relates to providing an organic microparticle system which can compete with or exceed performance of silica based microparticle systems. The present invention further can provide the same or better retention and drainage performance compared to some conventional inorganic microparticle products at lower treatment dosages. The ionic crosslinked acrylic acid-acrylate microparticles of the present invention can provide the performance improvements in an economical manner. Other advantages and benefits of the ionic crosslinked acrylic acid-acrylate microparticles of the present invention are described or can be apparent such as from the descriptions herein.

As described herein, the ionic crosslinked polymeric microparticles of the present invention can be partly, predominantly, substantially, essentially, or even entirely formed of ionic crosslinked acrylic acid-acrylate copolymer. For purposes herein, the term "ionic crosslinked acrylic acid-acrylate copolymer microparticles" also is used herein to identify the ionic crosslinked polymeric microparticles according to the present invention as differentiated from any conventional ionic crosslinked polymeric microparticles. Accordingly, the use herein of the term "ionic crosslinked acrylic acid-acrylate copolymer microparticle(s)" is not meant to necessarily exclude the co-presence of different material(s) in the same microparticles unless so specified. The ionic crosslinked acrylic acid-acrylate copolymer microparticles of the present invention can, for example, be a water-insoluble ionic crosslinked microparticulate polymer material (also known as ionic crosslinked polymeric microparticles or microbeads).

The ionic crosslinked acrylic acid-acrylate copolymer microparticles can, for example, be formed in emulsions and can, for example, be dispersed in aqueous treatment compositions and/or fiber suspensions to be treated. The ionic crosslinked acrylic acid-acrylate copolymer microparticles can be applied to papermaking pulp. After contacting papermaking pulp with the ionic crosslinked acrylic acid-acrylate copolymer microparticles, the resulting pulp can be further processed and formed into a paper or paperboard. Sheets of pulp from which the paper or paperboard products are made can exhibit excellent drainage and/or excellent retention of pulp fines, exceeding any expectations that may be drawn from the effects of silica microparticles or polyacrylamide-based microparticles on similar pulps. For purposes of this patent application, the terms "pulp," "stock," "paperstock," or "fiber suspension," can be used interchangeably.

The method of the present invention can be practiced on conventional paper making machines with modifications that can be easily made in view of the present invention. The method of the present invention can be practiced, for example, on a wet end assembly of a conventional papermaking machine with modifications that can be easily made in view of the present invention. The method can employ many different types of paper making pulp or combinations thereof.

As shown by experimental studies such as described herein, the use of ionic crosslinked acrylic acid-acrylate copolymer microparticles according to the present invention can give significantly improved retention and de-watering in papermaking processes. For example, the ionic crosslinked acrylic acid-acrylate copolymer microparticles can be added to the pulp in an amount that is effective to provide at least one of the properties: a) an increase in filler retention (%) at least about 10%, or at least about 15%, or at least about 20%; b) an increase in drainage (g/30 sec) of at least about 10%, or at least about 15%, or at least about 20%; and/or c) a reduction in turbidity (NTU) of at least about 10%, or at least about 15%, or at least about 20%, as compared to paper made with the pulp containing amorphous silica microparticles, for the polymeric microparticles at the same dosage and size, as measured with a Mütek DFR-4 tester. With the present invention, a paper product can be provided comprising paper pulp treated with ionic crosslinked acrylic acid-acrylate copolymer microparticles in an amount effective to provide at least one of the following properties: a) a filler retention of at least about 60%, or at least about 65%, or at least about 70%, or from about 60% to about 75%, or from about 65% to about 74%, measured with a Mütek DFR-4 tester using a dosage of 0.3 pound ionic crosslinked acrylic acid-acrylate copolymer microparticle per ton based on dried solids weight of the pulp; b) a water drainage of at least about 130 g/30 sec, or at least about 150 g/30 sec, or at least about 180 g/30 sec, or from about 130 g/30 sec to about 180 g/30 sec, or from about 140 g/30 sec to about 170 g/30 sec, measured with a Mütek DFR-4 tester using a dosage of 1 pound ionic crosslinked acrylic acid-acrylate copolymer microparticle per ton based on dried solids weight of the pulp; and/or c) a filtrate turbidity of less than about 950 nephelometric turbidity units (NTU), or less than 850 NTU, or less than about 800 NTU, or from about 700 NTU to about 950 NTU, or from about 725 NTU to about 900 NTU, measured with a Mütek DFR-4 tester using a dosage of 1 pound ionic crosslinked acrylic acid-acrylate copolymer microparticle per ton based on dried solids weight of the pulp.

The use of ionic crosslinked acrylic acid-acrylate copolymer microparticles as solid microparticles in a wet-end of papermaking, instead of silicon-containing particles, for example, is important to achieving the unique retention and drainage performance. The ability to both increase drainage rates and improve retention efficiencies allows for more economical production to be obtained, as, for example, production cycles can be accelerated without increasing white water recycling or handling/disposal requirements. Further, the joint improvement in fiber retention and drainage rate properties obtained in paper products made with ionic crosslinked acrylic acid-acrylate copolymer microparticle additive systems according to the present invention is unexpected and surprising.

A process according to present invention can be practiced on conventional papermaking machines, such as a Fourdrinier type paper machine, with modifications that can be easily made in view of the present invention. The ionic crosslinked acrylic acid-acrylate copolymer microparticles are typically added at the wet-end of a paper-making facility to the dilute cellulose fiber suspensions for the enhancement of water removal and retention of fine particles during papermaking. The ionic crosslinked acrylic acid-acrylate copolymer microparticles can be, for example, directly added to the fiber suspension in a papermaking machine in the form of an emulsions, or an aqueous dispersion, or combinations thereof, as the sole active agent therein or in combination with other active agents or other additives. The ionic crosslinked acrylic acid-acrylate copolymer preferably is introduced to the fiber suspension before sheet formation. This can be carried out, for example, by adding the ionic crosslinked acrylic acid-acrylate copolymer microparticles in the form of an aqueous composition to the fiber suspension in a mixing tank, flow conduit between process units, or some other point in the papermaking machine in which there is suitable agitation, such that the microparticles are dispersed with the components forming the paper and thus can act simultaneously with the components for forming the paper. Pulp collected on a forming wire screen can be further drained, pressed, and dried, and optionally further can be coated and converted. Any pulp fibers drained through the wire can be optionally recirculated to a white water silo. Before de-watering, the fiber suspension treated with the ionic crosslinked acrylic acid-acrylate copolymer microparticles can have one or more optional additional additives mixed into the fiber suspension, such as one or more different process additives and/or functional additives, including those conventionally used in papermaking. These other additives, if used, can be added before, during, and/or after introduction of the ionic crosslinked acrylic acid-acrylate copolymer microparticles. For example, optional additives can be introduced, for example, in a conventional blend chest, and/or other convenient location within a papermaking system before and/or after sheet formation. The additive system comprising the ionic crosslinked acrylic acid-acrylate copolymer microparticles can be added to a fiber suspension over a wide range of pH values, such as, for example, at a pH of from about 5 to about 9, or from about 5.5 to 7.5, or other values. The ionic crosslinked acrylic acid-acrylate copolymer microparticles described herein can be readily absorbed or retained by the cellulose fibers at these pH values.

As indicated, ionic crosslinked acrylic acid-acrylate copolymer microparticles are a component of the improved retention/drainage additive system of the present invention. The ionic crosslinked acrylic acid-acrylate copolymer microparticles can be anionic. The ionic crosslinked acrylic acid-acrylate copolymer forming the organic microparticles according to the present invention can incorporate a base copolymer resin (i.e., before crosslinking) having the following exemplary structure I:

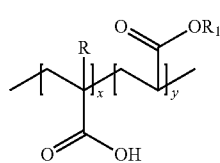

where R is hydrogen or an alkyl group having 1-8 carbon atoms, or 2-8 carbon atoms, or 3-8 carbon atoms, or 4-8 carbon atoms, or 1-4 carbon atoms (e.g., substituted or nonsubstituted methyl, ethyl, propyl, butyl, pentyl, hexyl, etc.); $R_1$ is hydrogen or an alkyl group having 1-20 carbon atoms, or 2-20 carbon atoms, or 3-20 carbon atoms, or 4-20 carbon atoms, or 1-10 carbon atoms (e.g., substituted or nonsubstituted methyl, ethyl, propyl, butyl, pentyl, hexyl, etc.), an alkoxyl group having 1-20 carbon atoms, or 2-20 carbon atoms, or 3-20 carbon atoms, or 4-20 carbon atoms, or 1-10 carbon atoms (e.g., substituted or nonsubstituted methoxyl, ethoxyl, propoxyl, butoxyl, pentyoxyl, hexoxyl, etc.), or an alkoxyalkyl group with alkoxy and alkyl independently having 1-20 carbon atoms, or 2-20 carbon atoms, or 3-20 carbon atoms, or 4-20 carbon atoms, or 1-10 carbon atoms (e.g., substituted or nonsubstituted methoxylmethyl, methoxylethyl, ethoxylmethyl, ethoxylethyl, propoxylmethyl, propoxylethyl, propoxylpropyl, butoxylmethyl, butoxylethyl, butoxylpropyl, butoxylbutyl, etc.). In the base polymer of structure I, the overall weight percent "x" of the acrylic acid units in the structure can be from about 1% to about 99% by weight, or from about 1% to about 45% by weight, or from about 5% to about 30% by weight, or from about 5% to about 95% by weight, or from about 10% to about 90% by weight, or from about 20% to about 80% by weight, or from about 30% to about 70% by weight, or from about 35% to about 65% by weight, or from about 40% to about 60% by weight, based on total weight of the copolymer, and the overall weight percent "y" of the acrylate units in the same copolymer structures can be from about 99% to about 1% by weight, or from about 99% to about 65% by weight, or from about 95% to about 70% by weight, or from about 95% to about 5% by weight, or from about 90% to about 10% by weight, or from about 80% to about 20% by weight, or from about 70% to about 30% by weight, or from about 65% to about 35% by weight, or from about 60% to about 40% by weight based on total weight of the copolymer. The copolymer of formula I can have a number average molecular weight, for example, of from about 5,000 to about 1,000,000, or from about 7,500 to about 750,000, or from about 10,000 to about 500,000, or from about 15,000 to about 100,000, or other molecular weights. Polymer molecular weight can be characterized, for example, using Waters Breeze System—Gel Permeation Chromatography (GPC).

The acrylic acid-acrylate copolymer of structure I can be an alternating copolymer, random copolymer, a diblock copolymer, a graft copolymer, individually or in combination, which is formed with x and y units comprising the indicated acrylic acid monomer units and acrylate monomer units, respectively. The respective monomer units can be present in the copolymer as single units, or as plural units linked directly together with other similar monomer units as chains, such as short chain segments. Mixtures of these different types of copolymers also may be used. An ionic acrylic acid-acrylate copolymer that is anionic is preferred. Accordingly, the acrylic acid component of the copolymer preferably can be in the acid form, though its presence as a water-soluble salt of acrylic acid may be used if the resulting monomer incorporating these units is anionic. The acrylic acid monomer may be, for example, potassium or sodium salts of acrylic acid. Similar considerations can apply to the acrylate monomer component of the copolymer. The acrylate monomer can, for example, be nonionic. Accordingly, the nonionic acrylate monomers differ from cationic monomers such as those having polyalkylated ammonium functionality or salts thereof. The copolymer preferably is in the form of anionic crosslinked polymeric water-insoluble microparticles. For purposes herein, "anionic" does not encompass amphoteric (i.e., contains both cationic and anionic charge).

For purposes herein, the term "acrylic acid monomer," when used in singular or in the plural forms thereof, can generally relate to at least one monomer or more of acrylic acid, methacrylic acid, ethacrylic acid, propacrylic acid, N-propacrylic acid, butacrylic acid, N-butacrylic acid, and/or other monomers such as those encompassed by the definitions indicated for R in formula I. For purposes herein, the term "acrylate monomer," when used in singular or in the plural forms thereof, can generally relate to at least one monomer or more of acrylate, methacrylate, propacrylate, N-propacrylate, butacrylate, N-butacrylate, and/or other monomers such as those encompassed by the definitions indicated for $R_1$ in formula I.

To provide ionic crosslinked polymer microparticles according to the present invention, the acrylic acid-acrylate copolymer, such as the base polymer of structure I, can be crosslinked with a crosslinking agent containing two or more nonconjugated points of ethylenic unsaturation, two or more nonconjugated vinylidene groups, a dialdehyde, or any combination thereof. As used herein, "thermosetting" and "crosslinking," and similar terms are intended to embrace the structural and/or morphological change that occurs, for example, by covalent chemical reaction or ionic interaction between separate molecules in a composition. The acrylic-acrylate copolymer can be crosslinked with a crosslinking agent(s), for example, that is divinyltoluene, divinylbenzene, divinylnaphthalene, trivinylbenzene, ethylene glycol diacrylate, trimethylene glycol diacrylate or dimethylacrylate, divinylxylene, divinylethylbenzene, divinyl ether, divinyl sulfone, an allyl ether of a polyhydric compound, divinylsulfide, allyl acrylate, diallyl maleate, diallyl fumarate, diallyl phthalate, diallyl succinate, diallyl carbonate, diallyl malonate, diallyl oxalate, diallyl adipate, diallyl sebacate, diallyl tartrate, diallyl silicate, triallyl isocyanate, trillyl tricarballylate, triallyl phosphate, triallyl citrate, triallyl aconitate, N,N'-methylenediacrylamide, N,N'-methylenedimethacrylamide, N,N'-ethylene diacrylamide, trimethylolpropane diallyl ether, tetraallyl pentaerythritol, triallyl pentaerythritol, diallyl pentaerythritol, ethylene glycol dimethacrylate, N,N'-methylene bisacrylamide or any combination thereof. The crosslinked acrylic acid-acrylate copolymer can be crosslinked with a crosslinking agent in a content, for example, of from about 1 to about 10,000 molar parts per million, or from about 10 to about 1,000 molar parts per million, or other amounts, of a crosslinking agent based on monomeric units present in the copolymer sufficient to induce crosslinking of the copolymer.

The ionic crosslinked polymeric microparticles can be prepared with acrylic acid-acrylate base polymer, such as shown in structure I, which comprises at least 25% by weight, or at least about 50% by weight, or at least about 75% by weight, at least about 90% by weight, or at least about 95% by weight, or at least about 99% by weight, or from about 90% by weight to 100 by weight, or from about 95% by weight to about 99% by weight, of the ionic crosslinked acrylic acid-acrylate copolymer. The base polymer of structure I which can be used to form the microparticles can, for example, have limited amounts of other types of monomeric units than acrylic acid and acrylate units. For example, the base polymer of structure I can contain, for example, less than about 5% by weight, or less than about 1% by weight, or less than about 0.1% by weight, or less than about 0.01% by weight, or from 0-1% by weight, or from 0-0.1% by weight, or from 0-0.01% by weight, or 0% by weight within measurable limits, total monomeric units having an acrylamide functionality. The base polymer of structure I forming the microparticles also can comprise less than about 5% by weight, or less than about 1% by weight, or less than about 0.1% by weight, or from 0-1% by weight, or from 0-0.1% by weight, or 0% by weight within measurable limits, total combined amount of monomeric units having an acrylamide functionality, an alkylformamide functionality, a vinyl acetamide functionality, a vinyl pyrrolidone functionality, and/or a polyalkylated ammonium functionality or salts thereof. The base polymer of structure I forming the microparticles also can comprise less than about 5% by weight, or less than about 1% by weight, or less than about 0.1% by weight, or from 0-1% by weight, or from 0-0.1% by weight, or 0% by weight within measurable limits, total combined amount of monomeric units that are cationic monomers.

The ionic crosslinked polymeric microparticles can be also prepared on copolymerization process with acrylic acid, acrylate monomer and crosslinking agent. Base polymer, such as shown in structure I. A crosslinking reaction used in making the ionic crosslinked polymeric microparticles can be conducted by at least two routes, including, for example, (a) synthesis of the polymer first, and then crosslinking of the polymer, or alternatively, (b) the crosslinking reaction can take place during the polymerization reaction.

Inverse emulsion polymerization techniques can be used to prepare the ionic crosslinked acrylic acid-acrylate copolymer microparticles of the present invention, although other polymerization methods known to those skilled in the art may be used. Inverse emulsion polymerization can be used as a chemical process for preparing high molecular weight water-soluble polymers or copolymers. In preparing the ionic crosslinked acrylic acid-acrylate copolymer microparticles herein, an inverse emulsion polymerization process can be conducted, for example, by a) preparing an aqueous solution of the acrylic acid and acrylate monomers; b) contacting the aqueous solution with a hydrocarbon liquid containing appropriate emulsification surfactant(s) or surfactant mixture to form an inverse monomer emulsion; c) subjecting the monomer emulsion to free radical polymerization in the presence of a polyfunctional crosslinking agent, and, optionally, d) adding a breaker surfactant to enhance the inversion of the emulsion when added to water.

Accordingly, ionic crosslinked polymeric microparticles can be formed as microparticles based upon acrylic acid and acrylate monomers using reverse phase emulsion polymerization. The indicated base polymer of structure I can be an intermediate product of this polymerization route (e.g., uncrosslinked copolymer). The description of the base polymer is a convenient way used to characterize monomeric constituents of the ultimately crosslinked microparticles. The polymerization conditions, such as used in a reverse phase emulsion polymerization, under which the monomer charge is reacted to form the copolymer are selected in such a manner that the copolymer product of the reaction can behave as a water-insoluble crosslinked microparticulate polymer product or microbead product in aqueous cellulosic fiber suspensions. The copolymeric microparticles of the present invention can be prepared by applying an inverse (water-in-oil) emulsion polymerization technique such as generally known to those skilled in the art, for example, see U.S. Patent Application Publication No. 2006/0142430 A1, which is incorporated herein in its entirety by reference. Surfactants and levels used in emulsion polymerizations are known to those skilled in the art. The surfactant usually can have a range of HLB (Hydrophilic Lipophilic Balance) values that is dependent on the overall composition. One surfactant or combinations of surfactants can be used. The surfactant may be, for example, at least one diblock or triblock surfactant, ethoxylated alcohol, polyoxyethylated sorbitol, hexaoleate, diethanolamine oleate, ethoxylated lauryl sulfate, or any combinations thereof. Suitable surfactants can include those such as set forth in the incorporated U.S. Patent Application Publication No. 2006/0142430 A1.

As indicated, reverse phase emulsion polymerization of the acrylic acid and acrylate monomers is conducted in the presence of a polyfunctional crosslinking agent to form the crosslinked composition containing the ionic crosslinked acrylic acid-acrylate copolymer microparticles. The polyfunctional crosslinking agent and levels used for this polymerization route include those indicated hereinabove.

The molecular weight of the ionic crosslinked acrylic acid-acrylate copolymer can be influenced, for example, by changing the reaction temperature, the level of solids in the reaction, an amount of initiator, an amount of chain transfer agent, and/or by other methods. Chain transfer agents can include, for example, isopropyl alcohol, mercaptans, sodium formate, and sodium acetate. Higher molecular weights can, for example, be provided with control of these parameters. Higher molecular weights of the copolymer products can be a factor correlating or contributing to water-insolubility of the ionic crosslinked copolymer microparticulate product of the reaction.

The ionic crosslinked acrylic acid-acrylate copolymer microparticles may be prepared by other polymerization routes other than reverse phase emulsion reactions. The base polymer of structure I, for example, can be obtained as a preformed water-soluble form of the polymer. The base polymer then can be crosslinked to form water-insoluble ionic crosslinked acrylic acid-acrylate copolymer microparticles. Polyfunctional crosslinking agents, such as indicated, may be used.

As indicated, reverse phase emulsion polymerization of the acrylic acid and acrylate monomers is conducted in the presence of a polyfunctional crosslinking agent to form the crosslinked composition containing the ionic crosslinked acrylic acid-acrylate copolymer microparticles.

The ionic crosslinked polymeric microparticles formed of the ionic crosslinked acrylic acid-acrylate copolymer can have an unswollen average particle size, for example, of from about 1 nanometer to about 10 micrometers (10,000 nm) or more, or from about 1.5 nanometers to about 7.5 micrometers (7,500 nm), or from about 2 nanometers to about 5 micrometers (5,000 nm), or from about 2.5 nanometers to about 2.5 micrometers (2,500 nm), or from about 3 nanometers to about 1 micrometer (1,000 nm), or from about 4 nanometers to about 0.5 micrometer (500 nm), or from about 5 nanometers to about 0.1 micrometer (100 nm), or from about 5 to about 50 nm, or from about 1 nm to about 50 nm, or from about 1 nm to about 40 nm, or other particle sizes.

Commercial sources of crosslinked polymeric microparticles which may be used as a source of ionic crosslinked acrylic-acrylate copolymer in microparticulate form for use in methods according to the present invention can include, for example, ALCOGUM® L-12 and ALCOGUM® L-15 (Akzo Nobel), ACUSOL® 810A (DOW-Rohm & Haas). ALCOGUM® L-12 is an anionic acrylate-containing alkali swellable emulsion copolymer supplied at 28.5% active solids in water.

If necessary to provide a desired particle size and/or particle distribution, raw ionic crosslinked acrylic acid-acrylate copolymer particles can be pulverized before use in papermaking. Wet pulverization, for example, can be used in this regard. A dispersion of ionic crosslinked acrylic acid-acrylate copolymer microparticles can be wet pulverized, for example, with commonly known comminuting equipment and methods of use, such as by using a high shear mixer, a homo mixer or a line mill, or other known wet type pulverizers, and preferably those which can apply high speed shearing forces.

The ionic crosslinked acrylic acid-acrylate copolymer microparticles according to the present invention, such as prepared by the indicated inversion emulsion polymerization techniques or obtained otherwise, can be readily employed as-is or in diluted aqueous form in papermaking, or can be held or stored for later use in the manufacture of paper as an aqueous solution, dispersion, or the original emulsion form. The present invention also relates to these emulsions and aqueous dispersions and solutions comprising the ionic crosslinked acrylic acid-acrylate copolymer microparticles. The ionic crosslinked acrylic acid-acrylate copolymer microparticles of the present invention can be formulated into or obtained as emulsions and dispersions which have a viscosity, for example, of less than about 45 cps (e.g., 1 cps to 24 cps, or 5 cps to 20 cps, or 10 cps to 20 cps), or particularly less than 25 cps, as measured on a Brookfield viscometer using #2 spindle at 60 rpm, at 37° C. These viscosities may be maintained, for example, for 1 to 28 days in storage at room temperature. The ionic crosslinked acrylic acid-acrylate copolymer microparticles, for example, can be contacted with pulp or fiber suspensions in papermaking, for example, as discrete microparticles or microbeads substantially homogeneously dispersed in a preformed emulsion or dispersed in an aqueous solution. The concentration of the ionic crosslinked acrylic acid-acrylate copolymer microparticles in an aqueous vehicle, aqueous solution, aqueous emulsion, or other aqueous delivery system is not particularly limited. Typically, the ionic crosslinked acrylic acid-acrylate copolymer microparticles can be used in effective concentrations and amounts for improving fiber retention and drainage once incorporated into the papermaking wet end and/or other process stage. In aqueous additives or packages containing or including the microparticles, the concentration of the ionic crosslinked acrylic acid-acrylate copolymer microparticles can, for example, be from about 1% to about 99% by weight, or 2% to about 95% by weight, or from about 3% to about 75% by weight, or from about 5% to about 60% by weight, or from about 7% to about 50% by weight, or from about 10% to about 40% by weight, or from about 12% to about 30% by weight, or other concentrations. The ionic crosslinked acrylic acid-acrylate copolymer microparticles of the present invention can have commercially useful and excellent stability for storage and transportation. The copolymer microparticles also can have easily adjustable structural features for different application requirements. For example, crosslinking degree can be adjusted based on requirements of performance, application conditions and emulsion solids. Another example is that the ratio of acrylic acid and acrylate in copolymer can be adjusted based on requirements of balance of hydrophobicity and hydrophilicity. Another example is other anionic monomers can be used to replace acrylic acid, such as maleic acid.

The ionic crosslinked polymeric microparticle can be added to the pulp in a papermaking process, such as at the wet end, in a total amount of at least about 0.1 pound of dried solids basis per ton, or at least 0.2 pound of dried solids basis per ton, or at least 1 pound of dried solids basis per ton, or from about 0.1 pound to about 10 pounds of dried solids basis per ton, or from about 0.3 pound to about 5 pounds of dried solids basis per ton, or from about 0.4 pound to about 4 pounds of dried solids basis per ton, or from about 0.5 pound to about 3 pounds of dried solids basis per ton, or from about 0.8 pound to about 2.5 pounds of dried solids basis per ton, based on dried solids weight of the paper making pulp, though other amounts can be used.

The additive system comprising the ionic crosslinked acrylic acid-acrylate copolymer microparticles according to the present invention is not limited to treating any particular type of paper and should find application in all grades of paper, Kraft paper, sulfite paper, semichemical paper, and the like, including paper produced using bleached pulp, unbleached pulp, or combinations thereof. For example, the drainage and retention improvements due to the ionic crosslinked acrylic acid-acrylate copolymer microparticles according to the present invention can be observed in different types of pulps. For example, the pulp may comprise virgin pulp and/or recycled pulp, such as virgin sulfite pulp, broke pulp, a hardwood kraft pulp, a softwood kraft pulp, mixtures of such pulps, and the like. The recycled pulp can be or include waste paper, old corrugated containers (OCC), and other used paper products and materials. For example, there are a variety of mechanical pulping methods to which this invention can be applied. For example, thermomechanical pulp (TMP) uses a combination of heated wood chips and mechanical processes. Stone Groundwood (SGW) grinds or macerates the wood chips. Chemithermomechanical pulp (CTMP) uses a variety of chemicals, heat, and grinding techniques to produce pulp. Different types of pulp require different types of paper although many papers can use a combination or "blend" of several different types of pulp and recycled/recovered paper. The papermaking pulp or stock can contain cellulose fibers in an aqueous medium at a concentration, for example, of at least about 50% by weight of the total dried solids content in the pulp or stock, though other concentrations may be used. These pulp formulations can be referred to as fiber furnishes.

In addition to the ionic crosslinked acrylic acid-acrylate copolymer microparticles, the pulps or stocks or fiber suspensions of the present invention may be treated with one or more optional additives within the papermaking system. These optional additives may include one or more, e.g., water-soluble polymers such as cationic, anionic and/or non-ionic polymers, coagulants, flocculants, secondary microparticles or other supplemental retention aids, clays, fillers (e.g., calcium carbonate, such as precipitated or grounded; titanium dioxide; talc; kaolin), surfactants, strength aids, dyes, pigments, microbiocides, (hemi)cellulytic enzymes, defoamers, pH adjusting agents such as alum, sodium aluminate, and/or inorganic acids, such as sulfuric acid, microbiocides, leveling agents, lubricants, wetting agents, optical brighteners, pigment-dispersing agents, cross-linkers, viscosity modifiers or thickeners, or any combinations thereof, and/or other conventional and non-conventional papermaking or processing additives. These optional additives, if used, are used in an amount effective for their respective purpose. In this respect, it is important to ensure that the content of these other optional agents do not adversely effect or impede the beneficial drainage and retention effects imparted by the ionic crosslinked acrylic acid-acrylate copolymer microparticles. As indicated, these additives can be added before, during, or after introduction of the ionic crosslinked acrylic acid-acrylate copolymer microparticles. The ionic crosslinked acrylic acid-acrylate copolymer microparticles can be added, for example, after most, if not all, other additives and components are added to the pulp, though other addition sequences may be used. Some optional additives, such as strength aids, coagulants, surfactants, secondary microparticles, and so forth, can, for example, be added simultaneously with the copolymer particles as a premixture therewith or concurrently from separate introduction sources. The pH of the (treated) pulp generally, but not exclusively, can be controlled to a defined level of from about 4.0 to about 8.5, and more suitably from about 4.5 to about 8.0.

The ionic crosslinked polymeric microparticles can be added to the pulp as an emulsion which further comprises one or more optional additives, such as, for example, a surfactant, wherein the surfactant is nonionic, cationic, or anionic. The surfactant may be carried into the fiber suspension as a component of another treatment composition, such as an inverted emulsion of the ionic crosslinked acrylic acid-acrylate copolymer microparticles, or added separately to the fiber suspension, or combinations thereof. Examples of the surfactant include, for example, those indicated hereinabove. If included, the surfactant can be used in the pulp in an amount of from about 0.01% to about 5%, or from about 0.1% to about 1.0%, (dry basis) pounds per ton based on dried solids weight of the pulp. The dispersions and emulsions of the ionic crosslinked polymeric microparticles can include wet strength aids and/or a dry strength aids to the pulp, as sequentially, simultaneously, or as a blend with the ionic crosslinked acrylic acid-acrylate microparticles. The strength aids can be cationic, anionic or amphoteric. The strength aids can, for example, be water-soluble materials. The strength aids can be, for example, starch, starch derivatives, polyacrylamide, glyoxal crosslinked polyacrylamide, polyvinylamine, carboxylmethyl cellulose, carboxymethyl starch, guar gum, polyamidoamine-epichlorohydrin resin, polyvinyl alcohol or any blend therefore. A coagulant, organic flocculant, or both, can be added to the pulp, as sequentially, simultaneously, or as a blend with the polymeric microparticles. The coagulant can be a cationic coagulant component, which can be or include a cationic organic polymer coagulant, an inorganic cationic coagulant, or combinations thereof. Cationic organic polymer coagulants can be, for example, polyamine, polyamidoamine-glycol, polyvinylamine (PVAm), polyethylene imine, polydiallyldimethylammonium chloride (Poly-DAD-MAC), glyoxalated cationic polyacrylamide, copolymer of vinylamine and acrylamide, or any combinations thereof. Inorganic cationic coagulants which can be used can be or include inorganic cationic chemicals (e.g., aluminum sulfate (alum), aluminum chloride, ferric chloride, ferric sulfate), cationic inorganic polymers (e.g., polyaluminum chloride (PAC) polyaluminum sulfate (PAS), polyaluminum sulfate silicate (PASS)), water-dispersible cationic mineral particles (e.g., cationic alumina mineral particles, a cationic colloidal silica sol), aluminum chlorohydrate (ACH), or any combinations thereof. The flocculant can be, for example, a cationic, anionic, nonionic, zwitterionic, or amphoteric polymer flocculant which can further increase retention and/or drainage in a papermaking furnish to the performance enhancements provided by the ionic crosslinked polymeric microparticles. The flocculant can be used in solid form, as an aqueous solution, as a water-in-oil emulsion, or as dispersion in water. Representative cationic polymers include, for example, copolymers and terpolymers of (meth)acrylamide with dimethylaminoethyl methacrylate (DMAEM), dimethylaminoethylacrylate methyl chloride quaternary salt-acrylamide copolymers, and sodium acrylate-acrylamide copolymers and hydrolyzed polyacrylamide polymers.

The pulp can comprise, for example, the ionic crosslinked acrylic acid-acrylate copolymer microparticle in an amount of at least about 0.1 pound (dry basis) per ton based on dried solids weight of the pulp, a coagulant in an amount of at least about 0.3 (dry basis) pound per ton based on dried solids weight of the pulp, and an organic flocculant in an amount of at least about 0.05 pound (dry basis) per ton based on dried solids weight of the pulp. The pulp can comprise, for example, the ionic crosslinked acrylic acid-acrylate copolymer microparticle in an amount of from about 0.1 to about 10, or from about 0.25 to about 1, (dry basis) pounds per ton based on dried solids weight of the pulp, a coagulant in an amount of from about 0.3 to about 10, or from about 0.5 to about 3, (dry basis) pounds per ton based on dried solids weight of the pulp, and an organic flocculant in an amount of from about 0.05 pound to about 10, or from about 0.1 to about 3, (dry basis) pounds per ton based on dried solids weight of the pulp. Other combinations of the ionic crosslinked acrylic acid-acrylate copolymer microparticle and various combinations of the indicated optional additives may be used.

The ionic crosslinked acrylic acid-acrylate microparticles can be used as the only microparticle in a retentive system applied to a papermaking process to provide the enhancements in filler retention and drainage. Other microparticles, such as silicon-containing microparticles, are not required. The papermaking pulp or stock according to the present invention may optionally further contain other types of microparticles. The ionic crosslinked acrylic acid-acrylate microparticles of the present invention are capable of being formulated with inorganic microparticles to make composite or physical mixtures of different microparticles for papermaking wet-end application. The different microparticles can be added in a common mixture or separately to a fiber suspension of a papermaking process that is treated. One or more different types of such secondary microparticle additives, i.e., any microparticle different from the ionic crosslinked acrylic acid-acrylate copolymer microparticles, if added, may be added to the pulp at any time during the process. The secondary microparticle additive, if used, can be, for example, a silica, bentonite, fibrous cationic colloidal alumina, natural or synthetic hectorite, zeolite, non-acidic alumina sol, cationic colloidal alumina microparticles, or any conventional particulate additives as are known to those skilled in the art. If added in the pulps or stocks of the present invention, the total secondary microparticle additive, such as silica and bentonite, can be present in any amount, such as from 0 to about 3 pounds per ton of paperstock, or from about 0.001 pound per ton to about 2 pounds per ton of paperstock, or from about 0.01 pound per ton to about 1 pound per ton of paperstock, based on the dried solids weight of both the microparticles and the paperstock, though other amounts can be used. As indicated, the secondary microparticles (e.g., silica and bentonite) can be essentially or entirely absent from the pulp. The total content of secondary microparticle additive, such as silica and bentonite, in the pulp optionally can be limited, for example, to amounts of 0 to about 0.1 pound per ton, or from about 0 to about 0.01 pound per ton, or from about 0 to about 0.001 pound per ton, based on dried solids weight of the pulp, and provide useful and improved fiber retention and drainage performance.

A paper product can be provided that includes the ionic crosslinked acrylic acid-acrylate copolymer microparticles of the present invention. The product may comprise at least one paper layer or web containing the ionic crosslinked acrylic acid-acrylate copolymer microparticles, for example, paper sheeting, liner board, newsprint, paperboard, tissue paper, fluting medium, and wall board. The paper made in processes according to the present invention can comprise, for example, from about 0.1 to about 2.5 pounds (lb.) ionic crosslinked acrylic acid-acrylate copolymer microparticles/ton dry fiber, or about 0.1 to about 1 lb. ionic crosslinked acrylic acid-acrylate copolymer microparticles/ton dry fiber, or about 0.2 to about 0.8 lb. ionic crosslinked acrylic acid-acrylate copolymer microparticles/ton dry fiber (on a solids/solids basis). The amount of ionic crosslinked acrylic acid-acrylate copolymer microparticles added to the paper, on a solids basis, can be expressed in weight percentage terms, wherein the amount of added ionic crosslinked acrylic acid-acrylate copolymer microparticles can be as low as about 0.005 wt % of the dry weight of the cellulose fibers, but usually does not exceed about 1.0% by weight. An amount of ionic crosslinked acrylic acid-acrylate copolymer microparticles in the range of about 0.01 wt % to 0.1 wt % of the dry paper weight can be more usual.

The addition of the polymer microparticle based retention system in accordance with the present invention can be practiced, for example, on conventional papermaking machines (such as a Fourdrinier type paper machine), for example, on wet end assemblies of a paper making machine. A flow chart of a paper making system for carrying out one of the methods of the present invention is set forth in FIG. 1. In FIG. 1, addition point options A, B, and C are shown for ionic crosslinked acrylic acid-acrylate copolymer microparticles. At least one, two, or all three of these options can be used. It is to be understood that the system shown is exemplary of the present invention and is in no way intended to restrict the scope of the invention.

In the system of FIG. 1, the supply of pulp shown represents a flow of pulp, as for example, supplied from a pulp holding tank or silo. The supply of pulp shown in FIG. 1 can be a conduit, holding tank, or mixing tank, or other container, passageway, or mixing zone for the flow of pulp. The pulp is passed through a refiner and then through a blend chest where optional additives may be combined with the treated pulp. The refiner has an inlet in communication with an outlet of the pulp tank, and an outlet in communication with an inlet of the blend chest. According to FIG. 1, the pulp treated in the blend chest is passed from an outlet of the blend chest through a communication to an inlet of a machine chest where optional additives may be combined with the treated pulp. The blend chest and machine chest can be of any conventional type known to those skilled in the art. The machine chest ensures a level head, that is, a constant pressure on the treated pulp or stock throughout the downstream portion of the system, particularly at the head box. From the machine chest, the pulp is passed to a white water silo and then to a fan pump, and then the pulp is passed through a screen. The screen can be sized, for example, so as to allow water containing undesirable or unusable components of the white water (e.g., fines, ash) to pass through the screen while retaining usable fibers on the screen that can be incorporated into the fibrous material supplied to the headbox. The screened pulp passes to a head box where a wet papersheet is formed on a wire and drained. The wire section can include equipment, for example, which is conventionally used and can be easily adapted for use in methods of the present invention. Pulp collected as a wet web on the forming wire can be further processed, for example, such as one or more of further drained, pressed, dried, calendered, or other processing such as typically used in a papermaking machine, before it may be conveyed to a winder, and it can be further conveyed to either paper sheeting or can be conveyed to coating and conversion stations (not shown). In the system of FIG. 1, drained pulp resulting from papermaking in the headbox is recirculated to the white water silo. Process temperatures in the papermaking system are not limited, and can be, for example, from about 15° C. to about 35° C., or from about 20° C. to about 34° C., or from about 25° C. to 33° C., or about 32° C., though other temperatures can be used.

The retention system comprising the ionic crosslinked acrylic acid-acrylate copolymer microparticles of the present invention is preferably introduced, for example, into the pulp at one or more of the introduction options A, B, C, or any combinations thereof, at the wet-end of the papermaking system. A supply of copolymer microparticles at indicated addition options A, B and/or C, can be, for example, a holding tank (not shown) having an outlet in communication with one or more flow lines between the process units, as illustrated, directly into the process units, or both. Conventional valving and pumps used in connection with introducing conventional additives can be used for introduction of the ionic crosslinked acrylic acid-acrylate copolymer microparticles. The papermaking apparatus of the present invention can include metering devices for providing a suitable concentration of the ionic crosslinked acrylic acid-acrylate copolymer microparticles or other additives to the flow of pulp.

As shown in FIG. 1, the introduction of the ionic crosslinked acrylic acid-acrylate copolymer microparticles can be done between the white water silo and the fan pump, and/or between the fan pump and the screen, and/or between the screen and the head box, or using any combinations of these introduction locations, and/or at other locations within the papermaking machine. Accordingly, the ionic crosslinked acrylic acid-acrylate copolymer microparticles can be added first to the refined treated pulp between the white water silo and the fan pump. The ionic crosslinked acrylic acid-acrylate copolymers alternatively or additionally can be added after the pulp passes through the screen and just prior to sheet formation in the head box. The ionic crosslinked acrylic acid-acrylate copolymers alternatively or additionally can be added to drained fibers collected at the head box and prior to recirculation to the white water silo.

A pulp or stock treated with the composition including ionic crosslinked acrylic acid-acrylate copolymers can exhibit good drainage during formation of the paperweb on the wire. The pulp or stock also can exhibit a desirable high retention of fiber fines and fillers in the paperweb products. Further, the use of the ionic crosslinked polymeric microparticles can provide reduced filtrate turbidities, which can be achieved in combination with faster drainage rates.

Although illustrated as used in papermaking, the ionic crosslinked acrylic acid-acrylate copolymer microparticles can be used in other applications, such as water treatment (waste water treatment, or industrial process water or aqueous systems other than papermaking), sludge dewatering, filtration aids for fibrous materials, additive for nonwoven production processes, inorganic fillers treatment, flocculation, or surface coatings.

The present invention includes the following aspects/embodiments/features in any order and/or in any combination:

1. The present invention relates to a method for making paper or paperboard comprising adding ionic crosslinked polymeric microparticles to a paper making pulp to form a treated pulp, and forming the treated pulp into paper or paperboard, wherein the ionic crosslinked polymeric microparticles comprise a crosslinked acrylic acid-acrylate copolymer.
2. The method of any preceding or following embodiment/feature/aspect, wherein the ionic crosslinked polymeric microparticle is added to the pulp in an amount of at least about 0.01 pound of dried solids basis per ton based on dried solids weight of the paper making pulp.
3. The method of any preceding or following embodiment/feature/aspect, wherein the polymeric microparticles are added to the pulp in an amount that is effective to provide at least one of the following properties:
    a) an increase in filler retention (%) at least about 10%,
    b) an increase in drainage (g/30 sec) of at least about 10%, and/or
    c) a reduction in turbidity (NTU) of at least about 10%, as compared to paper made with the pulp containing amorphous silica microparticles for the polymeric microparticles at same dosage and size, as measured with a Mütek DFR-4 tester.
4. The method of any preceding or following embodiment/feature/aspect, wherein the polymeric microparticles have an unswollen average particle size of from about 1 nanometer to about 10 micrometers.
5. The method of any preceding or following embodiment/feature/aspect, wherein the ionic crosslinked polymeric microparticles are anionic.
6. The method of any preceding or following embodiment/feature/aspect, wherein the copolymer having the structure:

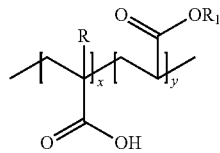

where R is hydrogen or an alkyl group having 1-4 carbon atoms; $R_1$ is hydrogen or an alkyl group having 1-20 carbon atoms, an alkoxyl group having 1-20 carbon atoms, or an alkoxyalkyl group with alkoxy and alkyl independently having 1-20 carbon atoms; wherein x is a weight percent from 1%-99% by weight based on total weight of the copolymer and y is a weight percent from 99%-1% by weight based on total weight of the copolymer; and the copolymer having a number average molecular weight of from about 5,000 to about 1,000,000.

7. The method of any preceding or following embodiment/feature/aspect, wherein the acrylic-acrylate copolymer is crosslinked with crosslinking agent containing two or more nonconjugated points of ethylenic unsaturation, two or more nonconjugated vinylidene groups, a dialdehyde, or any combination thereof.
8. The method of any preceding or following embodiment/feature/aspect, wherein the acrylic-acrylate copolymer is crosslinked with a crosslinking agent that is divinyltoluene, divinylbenzene, divinylnaphthalene, trivinylbenzene, ethylene glycol diacrylate, trimethylene glycol diacrylate or dimethylacrylate, divinylxylene, divinylethylbenzene, divinyl ether, divinyl sulfone, an allyl ether of a polyhydric compound, divinylsulfide, allyl acrylate, diallyl maleate, diallyl fumarate, diallyl phthalate, diallyl succinate, diallyl carbonate, diallyl malonate, diallyl oxalate, diallyl adipate, diallyl sebacate, diallyl tartrate, diallyl silicate, triallyl isocyanate, trillyl tricarballylate, triallyl phosphate, triallyl citrate, triallyl aconitate, N,N'-methylenediacrylamide, N,N'-methylenedimethacrylamide, N,N'-ethylene diacrylamide, trimethylolpropane diallyl ether, tetraallyl pentaerythritol, triallyl pentaerythritol, diallyl pentaerythritol, ethylene glycol dimethacrylate, N,N'-methylene bisacrylamide or any combination thereof.
9. The method of any preceding or following embodiment/feature/aspect, wherein the crosslinked acrylic acid-acrylate copolymer is crosslinked with a crosslinking agent in a content of from about 1 to about 10,000 molar parts per million of a crosslinking agent based on monomeric units present in the copolymer sufficient to induce crosslinking of the copolymer.
10. The method of any preceding or following embodiment/feature/aspect, wherein the ionic crosslinked polymeric microparticles comprise at least about 90% by weight of said crosslinked acrylic acid-acrylate copolymer.
11. The method of any preceding or following embodiment/feature/aspect, wherein the crosslinked acrylic acid-acrylate copolymer comprising less than about 1% by weight total monomeric units having an acrylamide functionality.
12. The method of any preceding or following embodiment/feature/aspect, wherein the crosslinked acrylic acid-acrylate copolymer comprising less than about 0.1% by weight total monomeric units having an acrylamide functionality.
13. The method of any preceding or following embodiment/feature/aspect, wherein the ionic crosslinked polymeric microparticles are added to the pulp as an emulsion, wherein said emulsion further comprising at least one surfactant.

14. The method of any preceding or following embodiment/feature/aspect, wherein the ionic crosslinked polymeric microparticles are added to the pulp as an emulsion further comprising a surfactant in an amount ranging from about 0.1% by weight to about 15% by weight based on the amount of added polymeric microparticles.

15. The method of any preceding or following embodiment/feature/aspect, wherein the ionic crosslinked polymeric microparticles are added to the pulp as an emulsion further comprising a surfactant, wherein the surfactant is nonionic, cationic, or anionic.

16. The method of any preceding or following embodiment/feature/aspect, further comprising adding a wet strength aid and/or a dry strength aid to the pulp, sequentially, simultaneously, or as a blend with the polymeric microparticles.

17. The method of any preceding or following embodiment/feature/aspect, wherein the strength aid is cationic, anionic or amphoteric.

18. The method of any preceding or following embodiment/feature/aspect, wherein the strength aid comprises starch, a starch derivative, polyacrylamide, glyoxal crosslinked polyacrylamide, polyvinylamine, carboxylmethyl cellulose, carboxymethyl starch, guar gum, polyamidoamine-epichlorohydrin resin, polyvinyl alcohol or any combination thereof.

19. The method of any preceding or following embodiment/feature/aspect, further comprising adding a coagulant and an organic flocculant to the pulp, sequentially, simultaneously, or as a blend with the polymeric microparticles.

20. The method of any preceding or following embodiment/feature/aspect, further comprising adding to the pulp the ionic crosslinked polymeric microparticle in an amount of at least about 0.01 pound (dry basis) per ton based on dried solids weight of the pulp, a coagulant in an amount of at least about 0.1 (dry basis) pound per ton based on dried solids weight of the pulp, and an organic flocculant in an amount of at least about 0.05 pound (dry basis) per ton based on dried solids weight of the pulp.

21. The method of any preceding or following embodiment/feature/aspect, wherein total silica and bentonite microparticle added to the pulp is in an amount no greater than about 0.01 pound per ton based on dried solids weight of the pulp.

22. The method of any preceding or following embodiment/feature/aspect, wherein total silica and bentonite microparticle added to the pulp is in an amount no greater than about 0.001 pound per ton based on dried solids weight of the pulp.

23. The method of any preceding or following embodiment/feature/aspect, wherein the paper comprises a cellulosic fibrous non-woven web.

24. A papermaking system for forming a paper making pulp into a paper or paperboard comprising:
a supply of papermaking pulp,
a blend chest in communication with said supply of pulp,
a screen for collecting pulp after discharge from the blend chest and optionally passing through one or more additional processing units before reaching the screen, and
a composition feeding device for feeding a composition to the pulp for application thereto prior to paper forming, wherein the composition comprising ionic crosslinked polymeric microparticles comprising a crosslinked acrylic acid-acrylate copolymer.

25. The system of any preceding or following embodiment/feature/aspect, wherein the composition is an emulsion further comprising at least one surfactant.

26. A product comprising a paper made by the method of any preceding or following embodiment/feature/aspect containing the ionic crosslinked polymeric microparticles.

27. The product according of any preceding or following embodiment/feature/aspect, wherein the product is paper sheeting, paperboard, tissue paper, or wall board.

28. The product according of any preceding or following embodiment/feature/aspect, wherein the product is newsprint or linerboard.

29. A paper product comprising paper pulp treated with ionic crosslinked polymeric microparticles comprising a crosslinked acrylic acid-acrylate copolymer in an amount effective to provide at least one of the following properties:
a) a filler retention of at least about 60% measured with a Mütek DFR-4 tester using a dosage of 0.3 pound ionic crosslinked polymeric microparticle per ton based on dried solids weight of the pulp,
b) a water drainage of at least about 130 g/30 sec measured with a Mütek DFR-4 tester using a dosage of 1 pound ionic crosslinked polymeric microparticle per ton based on dried solids weight of the pulp, and/or
c) a filtrate turbidity of less than about 950 NTU measured with a Mütek DFR-4 tester using a dosage of 1 pound ionic crosslinked polymeric microparticle per ton based on dried solids weight of the pulp.

The present invention can include any combination of these various features or embodiments above and/or below as set forth in sentences and/or paragraphs. Any combination of disclosed features herein is considered part of the present invention and no limitation is intended with respect to combinable features.

The present invention will be further clarified by the following examples, which are intended to be purely exemplary of the present invention, in which all percentages, parts, ratios and the like are proportions by weight unless otherwise specified.

EXAMPLES

In these experiments, the effects of exemplary ionic crosslinked acrylic acid-acrylate copolymer microparticles of the present invention on the de-watering rate and retention properties of an aqueous cellulosic suspension were compared to that of several commercial inorganic microparticles.

Example 1

Pulp Suspension Filler Retention and Drainage Tests.

In this test, the effect of different microparticles, with or without ionic crosslinked acrylic acid-acrylate copolymer microparticles, on bleached Kraft pulp on suspension fiber retention and de-watering rate was studied. Pulp stock (70% hardwood, 30% softwood)(CSF 450) was prepared from commercial pulpboards obtained from a commercial papermaking mill in the United States. The pulpboards were standard industry products. For pulp, bleached southern pine Kraft pulpboard (softwood pulpboard) and bleached southern mixed hardwood pulpboard were used for testing. For refining, the softwood pulpboard and the hardwood pulpboard were separately torn into small pieces and soaked in water overnight. Each of pulps was placed in a Valley beater for refining. A TAPPI standard method was applied for pulp refining (T200 om-89). The pulp was refined to a desired Canadian standard freeness (CSF) 450. The refined softwood and hardwood pulp was mixed at the ratio of 30:70 (softwood:

hardwood) and ready for use. The retention program used in these studies was a combination of microparticle, coagulant, and flocculant.

The starting furnish composition (by wt %) to which the retention program additives were introduced was 80% pulp and 20% filler (80% PCC, 20% $TiO_2$). The furnish consistency 0.7 wt %, pH 7.0. The ionic crosslinked acrylic-acrylate copolymer microparticle, designated "N-1" in the tables herein, was obtained in emulsion form as ACUSOL 810A (DOW-Rohm & Haas). The organic microparticle designated N-2 was obtained as ALCOGUM® L-12 (Akzo Nobel), organic microparticle designated N-3 was obtained as ACUSOL 805, organic microparticle designated N-4 was obtained as ACUSOL 880, organic microparticle designated N-5 was obtained as ACUSOL 835, organic microparticle designated N-6 was obtained as ACUSOL 882 and organic microparticle designated N-42 was obtained as ACUSOL 842. The silica microparticles used were a commercial silica BUFLOC® 5461 (Buckman Laboratories International, Inc., Memphis Term., U.S.A.)("5461" in tables herein), or a commercial anionic silica sol EKA NP890 (Eka Chemicals, Inc., Marietta, Ga.)("NP890" in tables herein). The bentonite used was a commercial BUFLOC® 5456. The coagulant used was a commercial polyamine flocculant BUFLOC® 5031 (Buckman Laboratories International, Inc.)("5031" in tables herein), or a starch which was a commercial BUFLOC 5567 (Buckman Laboratories International, Inc. ("5567" in tables herein). The flocculant used was a commercial anionic polyacrylamide coagulant BUFLOC® 5631 (Buckman Laboratories International, Inc.)("5631" in tables herein), or a commercial cationic polyacrylamide BUFLOC® 594 (Buckman Laboratories International, Inc.)("594" in tables herein). The dosages of these various retention program additives used in the samples is shown in the tables herein.

In a typical test, 800 mL 1.0% pulp suspension was added to a Mutek DFR-4 drainage/retention tester and was then mixed at 900 rpm. The coagulant was added five seconds before the addition of the flocculant. Five seconds after the addition of the flocculant, the mixing rate was lowered to 650 rpm. The microparticle retention aid, i.e., ionic crosslinked acrylic acid-acrylate microparticle or silica microparticle and/or bentonite microparticle, was added immediately after the mixing rate was lowered to 650 rpm. In Tables 1-7, dosages of components are described in terms of pounds (lb) component/ton dry fiber. After another five seconds, the mixing was stopped and 400 mL filtrate was allowed to pass through a 60 mesh wire. A higher drainage rate indicates a faster production rate, which can translate into a lower energy consumption during paper drying process. Filtrate turbidity was recorded using a HACH 2100 turbidimeter. A lower turbidity indicates a higher retention efficiency.

The test results in Table 1 show comparisons of retention performance for samples processed with the ionic crosslinked acrylic acid-acrylate microparticle with samples processed with silica microparticles. The results show that the ionic crosslinked acrylic acid-acrylate microparticles acquired similar retention than BUFLOC® 5461 silica at a much lower dosage level, namely, at about 35% of the silica dosage. Furthermore, the ionic crosslinked acrylic acid-acrylate microparticle achieved better retention performance than BUFLOC® 5461 silica at the same dosage, namely, over 10% increase in filler retention.

TABLE 1

Retention test results.

| Sample ID | Coagulant | Dosage lb/t | Flocculant | Dosage lb/t | Microparticle | Addition program | Dosage lb/t | Total retention % | Filler retention % |
|---|---|---|---|---|---|---|---|---|---|
| 1C | 5031 | 2.15 | 5631 | 0.3 | 5461 | co-mixing | 1.43 | 88.1 | 62.5 |
| 2C | 5031 | 2.15 | 5631 | 0.3 | NP890 | co-mixing | 0.71 | 89 | 64.6 |
| 3C | 5031 | 2.15 | 5631 | 0.3 | NP890 | co-mixing | 1.07 | 90.5 | 69.7 |
| 4C | 5031 | 2.15 | 5631 | 0.3 | NP890 | co-mixing | 1.43 | 90.7 | 70.4 |
| 5 | 5031 | 2.15 | 5631 | 0.3 | N-1 | co-mixing | 0.36 | 89.7 | 68.1 |
| 6 | 5031 | 2.15 | 5631 | 0.3 | N-1 | co-mixing | 0.50 | 90.3 | 69.4 |
| 7 | 5031 | 2.15 | 5631 | 0.3 | N-1 | co-mixing | 0.71 | 91.3 | 71.9 |
| 8 | 5031 | 2.15 | 5631 | 0.3 | N-1 | co-mixing | 1.07 | 91.1 | 71.5 |
| 9 | 5031 | 2.15 | 5631 | 0.3 | N-1 | co-mixing | 1.43 | 91.7 | 73.3 |
| 10C | 5031 | 2.15 | 5631 | 0.3 | N-3 | co-mixing | 1.43 | 89.9 | 67.4 |
| 11C | 5031 | 2.15 | 5631 | 0.3 | N-2 | co-mixing | 1.43 | 90.8 | 70.8 |
| 12C | 5031 | 2.15 | 5631 | 0.3 | N-5 | co-mixing | 1.43 | 89.1 | 65.9 |
| 13C | 5031 | 2.15 | 5631 | 0.3 | N-42 | co-mixing | 1.43 | 91.1 | 71.6 |
| 14C | 5031 | 2.15 | 5631 | 0.3 | N-4 | co-mixing | 1.43 | 86.1 | 55.5 |
| 15C | 5031 | 2.15 | 5631 | 0.3 | N-6 | co-mixing | 1.43 | 86.4 | 56.2 |

The test results of Table 2 compare retention performance for samples processed with the ionic crosslinked acrylic acid-acrylate microparticle with comparison samples processed with silica microparticles, in an anionic flocculant system. Applying less dosage, such as 50% less than silica, the polymeric microparticle acquired slightly better retention than the silica sol (EKA NP890) and 10% higher than BUFLOC® 5461 silica.

TABLE 2

Retention test results.

| Sample ID | Coagulant | Dosage lb/t | Flocculant | Dosage lb/t | Microparticle | Addition program | Dosage lb/t | Total retention % | Filler retention % |
|---|---|---|---|---|---|---|---|---|---|
| 16C | 5031 | 1.5 | 5631 | 0.3 | 5461 | Co-mixing | 1.00 | 87.6 | 61.21 |
| 17 | 5031 | 1.5 | 5631 | 0.3 | N-1 | Co-mixing | 0.28 | 88.5 | 63.96 |
| 18 | 5031 | 1.5 | 5631 | 0.3 | N-1 | Co-mixing | 0.50 | 89.44 | 67.14 |
| 19C | 5031 | 1.5 | 5631 | 0.3 | NP 890 | Co-mixing | 1.0 | 89.26 | 66.24 |

The test results of Table 3 show a retention comparison in a cationic flocculant system for samples made with the ionic crosslinked acrylic acid-acrylate microparticle with silica microparticles. Approximately a 10% of increase in filler retention was achieved using a lower dosage of the ionic crosslinked acrylic acid-acrylate microparticle compared to that of silica, such as 50% less.

TABLE 3

Retention test results.

| Sample ID | Coagulant | Dosage lb/t | Flocculant | Dosage lb/t | Microparticle | Addition program | Dosage lb/t | Total retention % | Filler retention % |
|---|---|---|---|---|---|---|---|---|---|
| 20C | 5031 | 1.5 | 594 | 1.0 | NP890 | Regular | 1.0 | 92.67 | 80.99 |
| 21 | 5031 | 1.5 | 594 | 1.0 | N-1 | Regular | 0.2 | 93.18 | 82.18 |
| 22 | 5031 | 1.5 | 594 | 1.0 | N-1 | Regular | 0.5 | 95.18 | 88.08 |
| 23 | 5031 | 1.5 | 594 | 1.0 | N-1 | Regular | 1.0 | 95.44 | 89.12 |

The test results of Table 4 show the retention efficacy of samples processed with the ionic crosslinked acrylic acid-acrylate microparticle as compared to comparison samples processed with silica microparticles at different dosage levels in a cationic flocculant system. An 8-10% of increase in filler retention was observed for samples processed with the ionic crosslinked acrylic acid-acrylate microparticle compared to silica microparticles.

TABLE 4

Retention test results.

| Sample ID | Coagulant | Dosage lb/t | Flocculant | Dosage lb/t | Microparticle | Addition program | Dosage lb/t | Total retention % | Filler retention % |
|---|---|---|---|---|---|---|---|---|---|
| 24C | 5031 | 1.5 | 594 | 0.5 | 5461 | Regular | 1.00 | 88.24 | 62.5 |
| 25C | 5031 | 1.5 | 594 | 0.5 | NP890 | Regular | 1.00 | 90.1 | 67.4 |
| 26 | 5031 | 1.5 | 594 | 0.5 | N-1 | Regular | 0.30 | 91.59 | 72.9 |
| 27 | 5031 | 1.5 | 594 | 0.5 | N-1 | Regular | 0.50 | 91.6 | 73 |
| 28 | 5031 | 1.5 | 594 | 0.5 | N-1 | Regular | 0.75 | 92.19 | 74.2 |
| 29 | 5031 | 1.5 | 594 | 0.5 | N-1 | Regular | 1.00 | 92.12 | 74 |

Figure 2:
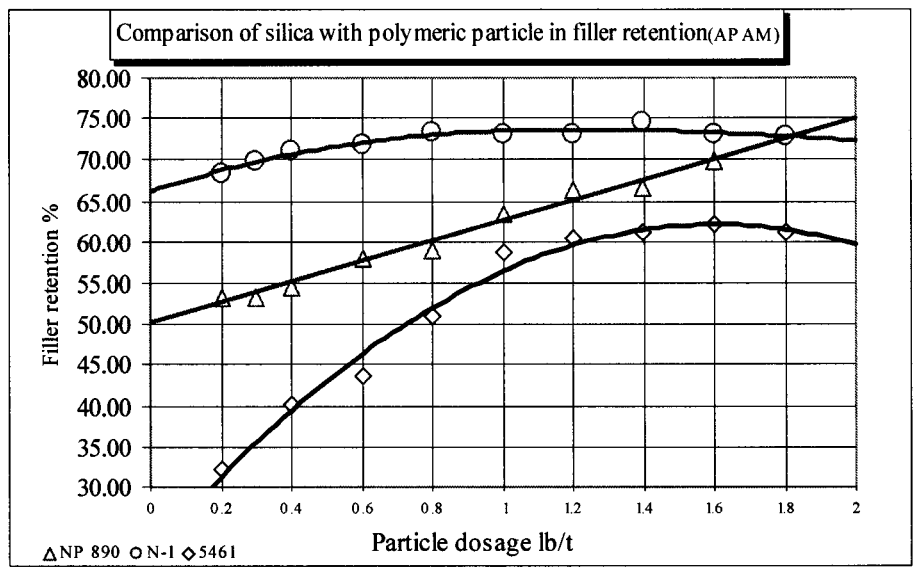
FIG. 2 is a graph showing data for an example herein which provides a comparison of ionic crosslinked acrylic acid-acrylate copolymer microparticle with two silica products in retention performance at different dosage levels in an anionic flocculant system which applies anionic polyacrylamide (10-25% of increase in filler retention compared to silica).

FIG. 2 shows results of a comparison of retention performance at different microparticle dosage levels in an anionic flocculant system of samples processed with the ionic crosslinked acrylic acid-acrylate microparticle (N-1) with comparison samples processed with the indicated two silica products (i.e., EKA NP890 and BUFLOC® 5461). A 10-25% increase in filler retention is exhibited for the samples processed with the ionic crosslinked acrylic acid-acrylate microparticle as compared to those processed with either one of the silica microparticles.

The test results of Table 5 show comparisons for studying coagulant impact on samples processed with the ionic crosslinked acrylic acid-acrylate microparticle with comparison samples processed with silica microparticles. As shown by the results, applying polyamine coagulant BUFLOC® 5031 at different dosage levels showed that more coagulant dosage can be beneficial for ionic crosslinked acrylic acid-acrylate microparticle performance; and applying cationic starch as coagulant did not show a positive impact on retention performance using the ionic crosslinked acrylic acid-acrylate microparticle compared to silica microparticle.

TABLE 5

Retention and turbidity test results.

| Sample ID | Coagulant | Dosage lb/t | Flocculant | Dosage lb/t | Microparticle | Addition program | Dosage lb/t | Total retention % | Filler retention % | Turbidity NTU |
|---|---|---|---|---|---|---|---|---|---|---|
| 30C | 5031 | 1.5 | 5631 | 0.3 | 5461 | Regular | 1.0 | 81.33 | 51.44 | >1000 |
| 31C | 5031 | 1.5 | 5631 | 0.3 | 5461 | Co-mix | 1.0 | 90.42 | 75.84 | 325 |
| 32 | 5031 | 1.5 | 5631 | 0.3 | N-1 | Co-mix | 1.0 | 92.49 | 80.77 | 224 |
| 33 | 5031 | 1.5 | 5631 | 0.3 | N-1 | Regular | 1.0 | 89.98 | 75.44 | 449 |
| 34 | 5031 | 1.0 | 5631 | 0.3 | N-1 | Co-mix | 1.0 | 91.57 | 78.29 | 247 |
| 35C | 5031 | 1.0 | 5631 | 0.3 | 5461 | Co-mix | 1.0 | 89.90 | 75.14 | 338 |
| 36C | 5567 | 2.0 | 5631 | 0.3 | 5461 | Co-mix | 1.0 | 90.10 | 75.46 | 343 |
| 37 | 5567 | 2.0 | 5631 | 0.3 | N-1 | Co-mix | 1.0 | 88.44 | 73.34 | 351 |
| 38C | 5567 | 3.0 | 5631 | 0.3 | 5461 | Co-mix | 1.0 | 87.76 | 69.43 | 517 |
| 39 | 5567 | 3.0 | 5631 | 0.3 | N-1 | Co-mix | 1.0 | 87.77 | 70.76 | 476 |
| 40C | 5031 | 1.0 | 5631 | 0.3 | 842 | Co-mix | 1.0 | 91.32 | 78.06 | 256 |

The test results of Table 6 show comparisons in a starch-cationic flocculant system of retention performance for samples processed with the ionic crosslinked acrylic acid-acrylate microparticles and comparison samples processed with silica microparticles. The ionic crosslinked acrylic acid-acrylate microparticle showed better performance than silica microparticles, such as a 10-15% of increase in filler retention compared to silica microparticles.

TABLE 6

Retention test results.

| Sample ID | Coagulant | Dosage lb/t | Flocculant | Dosage lb/t | Microparticle | Dosage lb/t | Total retention % | Filler retention % |
|---|---|---|---|---|---|---|---|---|
| 41C | 5567 | 2 | 594 | 0.5 | 5461 | 1.0 | 83.52 | 46.85 |
| 42C | 5567 | 2.5 | 594 | 0.5 | 5461 | 1.0 | 84.45 | 50.88 |
| 43C | 5567 | 3 | 594 | 0.5 | 5461 | 1.0 | 85.74 | 55.32 |
| 44C | 5567 | 3.5 | 594 | 0.5 | 5461 | 1.0 | 85.23 | 54.14 |
| 45 | 5567 | 2 | 594 | 0.5 | N-1 | 0.3 | 87.22 | 60.67 |
| 46 | 5567 | 2.5 | 594 | 0.5 | N-1 | 0.3 | 87.07 | 60.52 |
| 47 | 5567 | 3 | 594 | 0.5 | N-1 | 0.3 | 87.04 | 60.04 |
| 48 | 5567 | 3.5 | 594 | 0.5 | N-1 | 0.3 | 87.24 | 61.2 |

The test results in Table 7 show that formulating the ionic crosslinked acrylic acid-acrylate microparticles with bentonite also showed competitive retention performance against silica microparticles in treatment of samples.

TABLE 7

Retention test results.

| Test ID | Coagulant | Dosage lb/t | Flocculant | Dosage lb/t | Microparticle | Composition | Dosage lb/t | Total retention % | Filler retention % |
|---|---|---|---|---|---|---|---|---|---|
| 49C | 5031 | 1.5 | 594 | 1.0 | NP 890 | | 1.0 | 93.80 | 86.93 |
| 50 | 5031 | 1.5 | 594 | 1.0 | N-1 | | 1.0 | 96.41 | 92.18 |
| 51 | 5031 | | 594 | 1.0 | Modified Bentonite/N-1 | 50/50 | 1.0 | 95.24 | 90.09 |

TABLE 7-continued

Retention test results.

| Test ID | Coagulant | Dosage lb/t | Flocculant | Dosage lb/t | Microparticle | Composition | Dosage lb/t | Total retention % | Filler retention % |
|---|---|---|---|---|---|---|---|---|---|
| 52C | 5031 | 1.5 | 594 | 1.0 | Modified Bentonite/N-2 | 75/25 | 1.0 | 93.21 | 84.5 |
| 53 | 5031 | 1.5 | 594 | 1.0 | Bentonite/N-1 | 50/50 | 1.0 | 94.71 | 87.32 |

Figure 3:
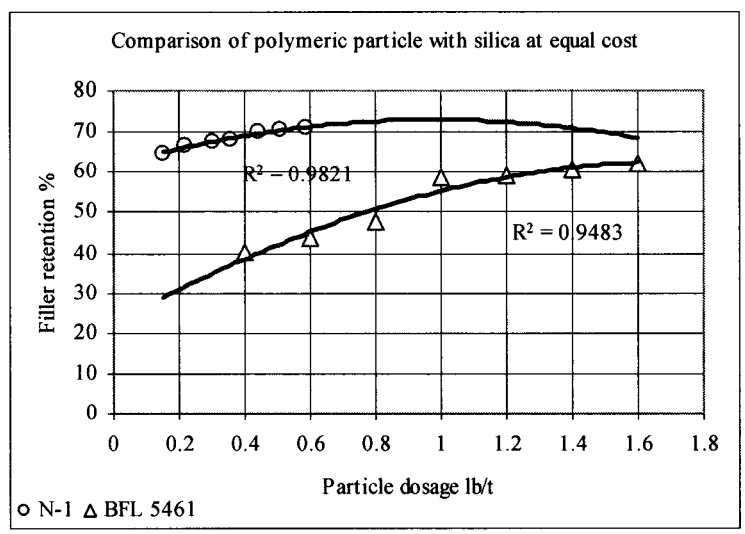
FIG. 3 is a graph showing data for an example herein which provides a comparison of ionic crosslinked acrylic acid-acrylate copolymer microparticle with silica in filler retention efficiency in applying anionic polyacrylamide at equal application cost.

FIG. 3 shows test results which compare the filler retention efficiency in an anionic polyacrylamide flocculant system for samples processed with the ionic crosslinked acrylic acid-acrylate microparticle (N-1) and comparison samples processed with silica microparticles (BFL 5461) at equal application cost. The better retention performance for the ionic crosslinked acrylic acid-acrylate microparticle was also confirmed.

The test results of Table 8 show Newsprint drainage for a comparison of samples processed with the ionic crosslinked acrylic acid-acrylate microparticle and formulated bentonite and comparison samples processed with silica. Approximately a 15% increase in drainage and over 20% reduction in turbidity for the samples treated with the ionic crosslinked acrylic acid-acrylate microparticle as compared to silica was observed. In these tested samples, the dosage level of BUFLOC® 5031 was 4.0 lb/ton, BUFLOC® 5511 was at 0.2 lb/ton, and the microparticles were used at a dosage of 1.0 lb/ton.

TABLE 8

Microparticle performance in drainage and turbidity of Newsprint.

| Sample Id | Microparticle | Drainage g/30 s | Turbidity NTU |
|---|---|---|---|
| 54C | 5461 | 127 | 1000 |
| 55 | N-1 | 150 | 752 |
| 56C | N-2 | 147 | 926 |
| 57 | Formulated betonite | 147 | 872 |

The test results in Table 9 show a comparison in formation and strength properties for samples processed with the ionic crosslinked acrylic acid-acrylate microparticle with comparison samples processed with silica microparticles. Overall, no significant difference in the strengths of the samples was observed in comparing the ionic crosslinked acrylic acid-acrylate microparticle and silica microparticles.

TABLE 9

Test results for formation and strength properties.

| Sample ID | Basic Weight g/m² | Tensile Index N·m/g | Burst Index kPa·m²/g | Tear Index mN·m²/g | Formation Index |
|---|---|---|---|---|---|
| NP 890 | 70.01 | 27.66 | 1.27 | 3.71 | 155 |
| N-1(0.3) | 70.72 | 27.72 | 1.33 | 3.58 | 146 |
| N-1 formulation | 68.63 | 28.22 | 1.57 | 3.85 | 169 |
| N-1(0.5) | 72.95 | 25.17 | 1.53 | 3.66 | 130 |

As shown in Tables 1-8, and FIGS. 2-3, the addition of ionic crosslinked acrylic acid-acrylate copolymer microparticles increased retention/drainage performance significantly of all products. Further, for the ionic crosslinked acrylic acid-acrylate copolymer microparticle containing products, much lower filtrate turbidities (Table 5), combined with faster drainage rate (Table 8), were provided compared to the conventional commercial microparticles processed with silica microparticles. Furthermore, the test results show that the ionic crosslinked acrylic acid-acrylate microparticle can provide these improvements in retention and drainage while maintaining comparable paper strength properties as compared to treatment with silica microparticles.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method for making paper or paperboard comprising adding ionic crosslinked polymeric microparticles to a paper making pulp to form a treated pulp, and forming the treated pulp into paper or paperboard, wherein the ionic crosslinked polymeric microparticles comprise a crosslinked acrylic acid-acrylate copolymer, wherein the copolymer having the structure:

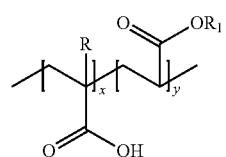

where R is hydrogen or an alkyl group having 1-4 carbon atoms; $R_1$ is hydrogen or an alkyl group having 1-20 carbon atoms, an alkoxyl group having 1-20 carbon atoms, or an alkoxyalkyl group with alkoxy and alkyl independently having 1-20 carbon atoms; wherein x is a weight percent from 1%-99% by weight based on total weight of the copolymer and y is a weight percent from 99%-1% by weight based on total weight of the copolymer; and the copolymer having a number average molecular weight of from about 5,000 to about 1,000,000.

2. The method of claim 1, wherein the ionic crosslinked polymeric microparticle is added to the pulp in an amount of at least about 0.01 pound of dried solids basis per ton based on dried solids weight of the paper making pulp.

3. The method of claim 1, wherein the polymeric microparticles are added to the pulp in an amount that is effective to provide at least one of the following properties:
   a) an increase in filler retention (%) at least about 10%,
   b) an increase in drainage (g/30 sec) of at least about 10%, and/or
   c) a reduction in turbidity (NTU) of at least about 10%,
as compared to paper made with the pulp containing amorphous silica microparticles for the polymeric microparticles at same dosage and size, as measured with a Mütek DFR-4 tester.

4. The method of claim 1, wherein the polymeric microparticles have an unswollen average particle size of from about 1 nanometer to about 10 micrometers.

5. The method of claim 1, wherein the ionic crosslinked polymeric microparticles are anionic.

6. The method of claim 1, wherein the acrylic-acrylate copolymer is crosslinked with crosslinking agent containing two or more nonconjugated points of ethylenic unsaturation, two or more nonconjugated vinylidene groups, a dialdehyde, or any combination thereof.

7. The method of claim 1, wherein the acrylic-acrylate copolymer is crosslinked with a crosslinking agent that is divinyltoluene, divinylbenzene, divinylnaphthalene, trivinylbenzene, ethylene glycol diacrylate, trimethylene glycol diacrylate or dimethylacrylate, divinylxylene, divinylethylbenzene, divinyl ether, divinyl sulfone, an allyl ether of a polyhydric compound, divinylsulfide, allyl acrylate, diallyl maleate, diallyl fumarate, diallyl phthalate, diallyl succinate, diallyl carbonate, diallyl malonate, diallyl oxalate, diallyl adipate, diallyl sebacate, diallyl tartrate, diallyl silicate, triallyl isocyanate, trillyl tricarballylate, triallyl phosphate, triallyl citrate, triallyl aconitate, N,N' -methylenediacrylamide, N,N' -methylenedimethacrylamide, N,N' -ethylene diacrylamide, trimethylolpropane diallyl ether, tetraallyl pentaerythritol, triallyl pentaerythritol, diallyl pentaerythritol, ethylene glycol dimethacrylate, N,N'-methylene bisacrylamide or any combination thereof.

8. The method of claim 1, wherein the crosslinked acrylic acid-acrylate copolymer is crosslinked with a crosslinking agent in a content of from about 1 to about 10,000 molar parts per million of a crosslinking agent based on monomeric units present in the copolymer sufficient to induce crosslinking of the copolymer.

9. The method of claim 1, wherein the ionic crosslinked polymeric microparticles comprise at least about 90% by weight of said crosslinked acrylic acid-acrylate copolymer.

10. The method of claim 1, wherein the crosslinked acrylic acid-acrylate copolymer comprising less than about 1% by weight total monomeric units having an acrylamide functionality.

11. The method of claim 1, wherein the crosslinked acrylic acid-acrylate copolymer comprising less than about 0.1% by weight total monomeric units having an acrylamide functionality.

12. The method of claim 1, wherein the ionic crosslinked polymeric microparticles are added to the pulp as an emulsion, wherein said emulsion further comprising at least one surfactant.

13. The method of claim 1, wherein the ionic crosslinked polymeric microparticles are added to the pulp as an emulsion further comprising a surfactant in an amount ranging from about 0.1% by weight to about 15% by weight based on the amount of added polymeric microparticles.

14. The method of claim 1, wherein the ionic crosslinked polymeric microparticles are added to the pulp as an emulsion further comprising a surfactant, wherein the surfactant is nonionic, cationic, or anionic.

15. The method of claim 1, further comprising adding a wet strength aid and/or a dry strength aid to the pulp, sequentially, simultaneously, or as a blend with the polymeric microparticles.

16. The method of claim 15, wherein the strength aid is cationic, anionic or amphoteric.

17. The method of claim 15, wherein the strength aid comprises starch, a starch derivative, polyacrylamide, glyoxal crosslinked polyacrylamide, polyvinylamine, carboxylmethyl cellulose, carboxymethyl starch, guar gum, polyamidoamine-epichlorohydrin resin, polyvinyl alcohol or any combination thereof.

18. The method of claim 1, further comprising adding a coagulant and an organic flocculant to the pulp, sequentially, simultaneously, or as a blend with the polymeric microparticles.

19. The method of claim 1, further comprising adding to the pulp the ionic crosslinked polymeric microparticle in an amount of at least about 0.01 pound (dry basis) per ton based on dried solids weight of the pulp, a coagulant in an amount of at least about 0.1 (dry basis) pound per ton based on dried solids weight of the pulp, and an organic flocculant in an amount of at least about 0.05 pound (dry basis) per ton based on dried solids weight of the pulp.

20. The method of claim 1, wherein total silica and bentonite microparticle added to the pulp is in an amount no greater than about 0.01 pound per ton based on dried solids weight of the pulp.

21. The method of claim 1, wherein total silica and bentonite microparticle added to the pulp is in an amount no greater than about 0.001 pound per ton based on dried solids weight of the pulp.

22. The method of claim 1, wherein the paper comprises a cellulosic fibrous non-woven web.

23. The method of claim 1, wherein the crosslinked acrylic acid-acrylate copolymer comprising less than about 5% by weight total monomeric units having an acrylamide functionality.

* * * * *

UNITED STATES PATENT AND TRADEMARK OFFICE
CERTIFICATE OF CORRECTION

PATENT NO. : 8,480,853 B2  
APPLICATION NO. : 13/281597  
DATED : July 9, 2013  
INVENTOR(S) : Weiping Ban Page 1 of 1

It is certified that error appears in the above-identified patent and that said Letters Patent is hereby corrected as shown below:

TITLE PAGE ITEM (66), IN RELATED U.S. APPLICATION DATA:

"Substitute for" should read -- Provisional --

Signed and Sealed this
Seventeenth Day of September, 2013

Teresa Stanek Rea
*Deputy Director of the United States Patent and Trademark Office*